(12) United States Patent
Winget et al.

(10) Patent No.: US 6,426,756 B1
(45) Date of Patent: Jul. 30, 2002

(54) METHOD AND APPARATUS FOR A MODIFIED LINEAR FILTER USING TEXTURE DATA AS PHASE ANGLE

(75) Inventors: Nancy Cam Winget, Mountain View; Richard Silkebakken, Santa Clara, both of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/328,164

(22) Filed: Jun. 8, 1999

(51) Int. Cl.[7] .............................................. G06T 11/40
(52) U.S. Cl. ...................................................... 345/582
(58) Field of Search ................................. 345/430, 582, 345/606–610

(56) References Cited

U.S. PATENT DOCUMENTS

| | | | | |
|---|---|---|---|---|
| 4,615,013 | A | * | 9/1986 | Yan et al. |
| 6,151,029 | A | * | 11/2000 | Shirman et al. |
| 6,181,347 | B1 | * | 1/2001 | Devic et al. |
| 6,204,855 | B1 | * | 3/2001 | Khaund |

OTHER PUBLICATIONS

K.L. Chan and K. McCarty, Aspects of the Statistical Texture Analysis of Medical Ultrasound Images, 1990, IEE Colloquium on Ultrasound Instrumentation, pp. 3/1–3/3.*

* cited by examiner

Primary Examiner—Jeffery Brier
(74) Attorney, Agent, or Firm—Washburn Woodcock LLP (57) ABSTRACT

A method and apparatus for a modified linear filter using texture data as phase angle. In one embodiment, the present invention recites a method for filtering attribute data onto a display pixel using a minimum phase-angle average. First, a display pixel location is received. Then, a first and a second attribute data value, in the form of a texel, is received. A filtering calculation for the first attribute data values creates a filtered first texel attribute data value such that the difference between the filtered first attribute data value and the second attribute data value is not greater than approximately half the magnitude of the maximum attribute data value. Finally, an average is calculated using the filtered first attribute data value and the second attribute data value. The average will be the resultant attribute value assigned to the display pixel location. By using the steps in this method, the present invention provides more appropriate interpolation of attribute data values.

16 Claims, 8 Drawing Sheets

METHOD AND APPARATUS FOR A MODIFIED LINEAR FILTER USING TEXTURE DATA AS PHASE ANGLE

TECHNICAL FIELD

The present claimed invention relates to the field of computer controlled graphics display systems. Specifically, the present claimed invention relates to an apparatus and a method for linearly filtering data using the phase angle of the texture data to render an interactive graphics display.

BACKGROUND ART

Computer controlled graphics systems are used for displaying graphics objects on a display screen. A graphics object is composed of graphics primitive elements ("graphics primitives") that include points, lines, polygons, etc. that render a two-dimensional (2D) image of a three dimensional (3D) object on a display screen. Each graphics primitive element within the graphics object is represented by a data structure. By linking all the graphics primitive elements and their respective data structures, a linked data structure is stored in computer memory. Each graphics primitive in the geometrical model is, in turn, associated with the proper attributes to give it the desired color, texture, etc.

Figure 1A:
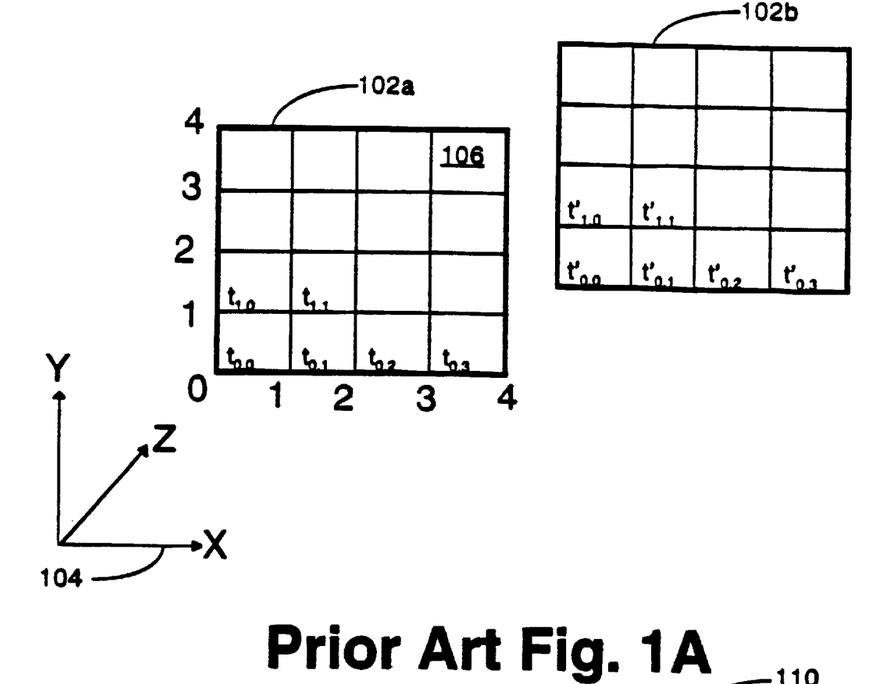
FIG. 1A is an illustration of a conventional texture map.

Prior Art FIG. 1A presents an illustration of texture maps 102a and 102b. Each of the two maps covers the 'X' and 'Y' spatial dimension as indicated by the coordinate axes 104. Multiple texture maps 102a and 102b can be used to provide another aspect to texture data. Texture maps are used to create a more realistic looking 2D image of a 3D object by digitally 'covering' the surface of an object with a texture. Texture map 102a is comprised of one or more texels, or tiles, e.g. 106. Texels are essentially a pixel with a texture attribute. In Prior Art FIG. 1, the tiles, a.k.a. texels, in the lower left corner of texture map 102a have been labeled t(0,0), t(0,1), t(1,0), and t(1,1) and of texture map 102b have been labeled with the primed equivalent. These texels usually represent a texture pattern (e.g. a texture having a constant, a pattern, a gradient, etc. appearance of color, intensity, etc.).

Figure 1B:
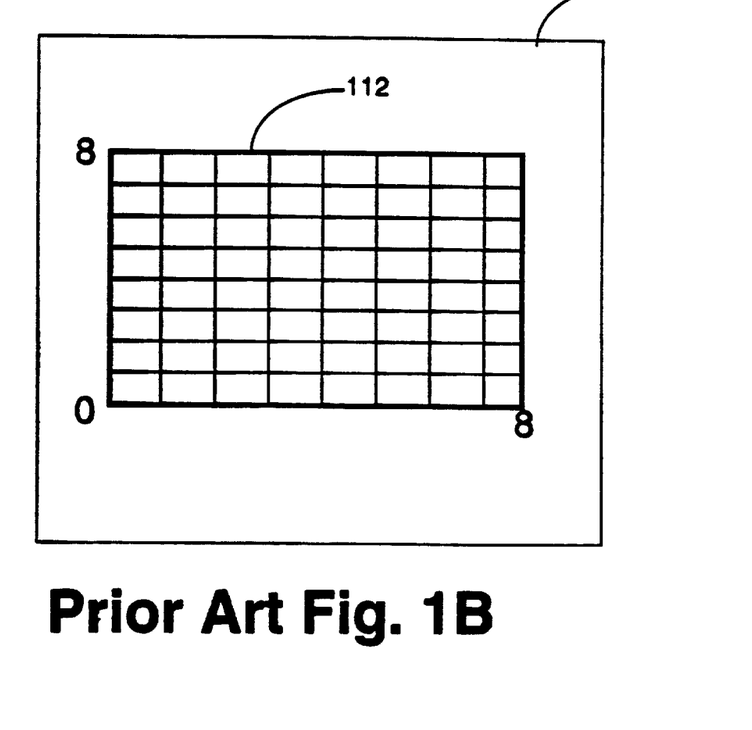
FIG. 1B is an illustration of a conventional display device having a field to which a conventional texture map will be projected.

Referring now to Prior Art FIG. 1B, an illustration of a conventional display device 112 having a field to which a conventional texture map will be projected is presented. The texture of the tile is in the form of data that can be mathematically stretched, shrunk, or flexed to cover a given 2D or 3D object, e.g. the rectangular surface 112 projected on conventional display device 110. If the 2-dimensional texel map 102a from Prior Art FIG. 1 A was used to map rectangular surface 112 projected in conventional display device 110, then texel map 102a would have to be digitally stretched to cover the surface due to the difference in indexes, e.g. a 4×4 matrix to an 8×8 matrix.

The process of mapping a texture onto a geometry can be defined as a function that maps a texel (s,t) or a set of texels {(s0, t0), (s1, t1) ... (sn, tn)} to a point (u,v) of the geometry. The function defining the resulting texture on the geometry f(u, v) is defined by, or equivalent to, a function that manipulates the texel values, g(s, t). There are three conventional functions, or 'filters,' that are typically used for mapping. The first is a 'nearest' filter, the second is a 'linear' filter, and the third is a 'weighted' filter. These three filters will be described below with an example. The example will stretch a 4×4 texture into an 8×8 image. The set of texels is made up of four points, using s, t={0, 1, 2, 3}, in two directions. The image to receive the texture is made up of eight points, using u, v={0, 1, 2, 3, 4, 5, 6, 7}, in two dimensions.

The first filter is a nearest filter. For a linear filter, the texels are scaled to the geometry in a mapping function similar to:

$f(u)$=floor $(2*s)$ $f(v)$=floor $(2*0t)$ $T(u,v)=f(u,v)$

The function T(u, v) represents the resulting texel color value at f(u, v). The mapping function described above is the nearest filter because only the texel point (s, t) closest to a given geometry point (u, v) is chosen as the texel value for the given geometry point.

In the second filter, the linear filter, the mapping function uses the four nearest texels, for a two-dimensional field, to obtained the resulting filtered texel. Thus, for example, one possible mapping function can be defined as:

$f(u)$=floor $(2*s)$ $f(v)$=floor $(2*t)$ $$T(u, v) = \frac{f(u, v) + f(u, (v+1)) + f((u+1), v) + f((u+1), (v+1))}{4}$$

The mapping described by T(u, v) sums the four nearest texels, then divides by four to normalize the result.

In the third filter, the weighted filter, the mapping function applies a weighting function to the linear filter to bias the texel values depending on their relative closeness to the geometry point. Hence, the mapping function could be:

$T(u, v)$=Fraction_of $[(1-A)*T0 + A*T1]$ where:

$T0$=Fraction_of $[(1-A)*f(u, v)]+[A *f(u,(v+1))]$ $T1$=Fraction_of $[(1-A)*f((u+1), v)]+[A *f((u+1), (v+1))]$ and where A=the weighted coefficient to be used. Note that this weighted filter function simplifies to the linear filter used above if A=0.5. The weighting function can be further refined by specifying different values for A, the weighting coefficient, for each equation of T0, T1 and T(u, v).

While all these prior art filters provide different functions for computing a resulting texel value from a set of texels, they are constrained to a rectangular coordinate system. However, some applications, such as ultrasound data, represent their texel values using a polar coordinate system. That is, the texel values represent the phase or angular position. For example, ultrasound data can measure echo amplitude, frequency and phase throughout an image. The phase and frequency changes are used to indicate motion and relative velocities. That is, the measured differences in phase and frequency is used to study, for example blood flow. In the example of medical ultrasound, motion or blood flow is assigned a color value that represents velocity and flow direction. More specifically, flow toward the transducer can be assigned , for example, the color red, with a shift toward yellow at higher velocities. Similarly, flow away from the transducer is assigned the color blue with a shift toward green for higher velocities. No motion or flow is assigned the color black. It is precisely this angular form of data that is inadequately filtered using rectangular coordinate system filter functions.

Figure 1C:
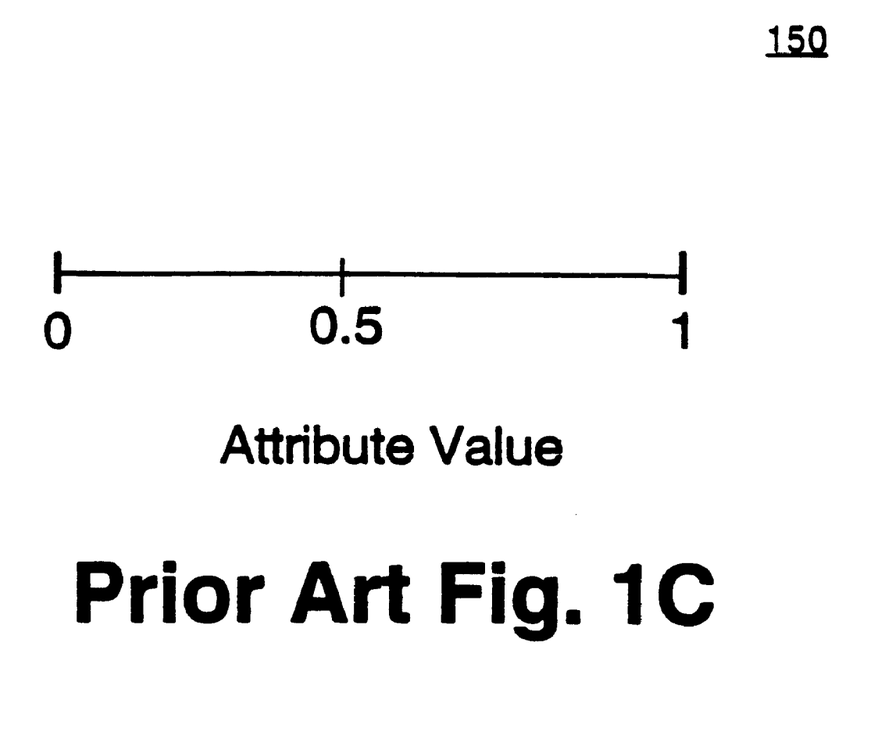
FIG. 1C is a conventional normalized scale for attribute data.

An exemplary prior art normalized scale 150 for attribute data is presented in prior art FIG. 1C. The normalized scale

150 necessarily has a range from 0.0 to 1.0. This figure illustrates the averaging method used in the conventional filters. In this example, if two texels being averaged from texture map 100 have values of 0.8 and 0.2, their weighted average will be somewhere between 0.2–0.8, and their simple average will be 0.5. Neither the weighted average nor the simple average will be between 0.0–0.2 or 0.8–1.0.

Likewise, if the two texels being averaged have values of 0.4 and 0.6, their weighted average will be somewhere between 0.4 and 0.6, and their simple average will be 0.5. Again, neither the weighted average nor the simple average for this set of numbers will be between 0.0–0.4 or 0.6–1.0. This is assuming that the attribute data has been normalized to a maximum value of 1. Unfortunately, with this form of averaging, the averaged value must always be greater than the smallest attribute value and less than the largest attribute value. Consequently, the averaged value can be drastically different than the two nearest values. For example, an averaged value of 0.5 is clearly very proximate to attribute values of 0.4 and 0.6. However, an averaged value of 0.5 is very distant from either attribute values of 0.1 and 0.9. That is, the average of 0.5 is located 0.4 units away from 0.1 and from 0.9 Additionally, if the data is digitized, then harmonic scales of the 0–1 scale essentially continue out from 1.0 to 2.0 to 3.0, etc. Hence, a need arises for a method to average, e.g. interpolate, a value that accounts for the phase of the digitized attribute data.

As mentioned, the medical field of cardiology uses ultrasound procedures to determine blood flow through a patient's body. The ultrasound procedure uses a transmitter/receiver head that can detect speed of blood flow and direction of blood flow using Doppler-effect concepts. The ultrasound data is fed into a graphics machine and processed with texture mapping to create a visual image of the blood flow patterns for diagnosis. However, because of the normalization and phase of the ultrasound blood flow data, a need arises for a method of interpolating the texture mapping operation to account for the phase data.

In summary, a need exists for finding an average, or interpolated, value that accounts for the phase data. Furthermore, a need arises for a method of interpolating the texture mapping operation to account for the magnitude data and phase data. If these needs are met, then more accurate images may be obtained, more accurate diagnoses may follow using faster and less-expensive computer processing hardware and software.

DISCLOSURE OF THE INVENTION

The present invention provides a method and apparatus for a modified linear filter using the texture data as phase angle data to render an interactive graphics display.

Specifically, in one embodiment, the present invention recites a method for filtering attribute data onto a display pixel using a minimum phase-angle average. First, a display pixel location is received. Then, a first and a second attribute data value is received. Subsequently, a filtering calculation is performed for the first attribute data value to create a filtered first texel attribute data value such that the resulting difference between the filtered first attribute data value and the second attribute data value is not greater than approximately half the magnitude of the maximum attribute data value. Finally, an average is calculated using the filtered first attribute data value and the second attribute data value. The average will be the resultant attribute value assigned to the display pixel location. By using the steps in this method, the present invention filters the texture data as phase angle data to render more meaningful texture mapping.

In another embodiment, the present invention recites a method of filtering attribute data within a graphics region of a computer controlled graphics display system having a processor coupled to a bus, a display device coupled to the bus and a computer readable memory unit coupled to the bus. The method comprises several steps. First, a display pixel location is received. Then, a plurality of attribute-data texels that are spatially proximate to the display pixel location are selected. Subsequently an interim attribute-data value, equivalent to the minimum phase-angle simple average from the attribute data value of two of the plurality of texels selected, is determined. The previous step is repeated until all the texels have been utilized once to determine an attribute data value. Another step determines a post-interim attribute data value. The post-interim attribute data value is equivalent to the minimum phase-angle average of two of the interim attribute data values, if available. Then, the previous step is repeated until all interim attribute data values have been utilized once to determine a post-interim attribute data value. In the last step, a final attribute data value for the display pixel location is determined. The final attribute data value is equivalent to the minimum phase-angle average of the last two post-interim attribute-data values, if available.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART

PRIOR ART

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

NOTATION AND NOMENCLATURE

Some portions of the detailed descriptions which follow (e.g., flowcharts 400, 500, and 600) are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER CONTROLLED GRAPHICS DISPLAY SYSTEM

Figure 2:
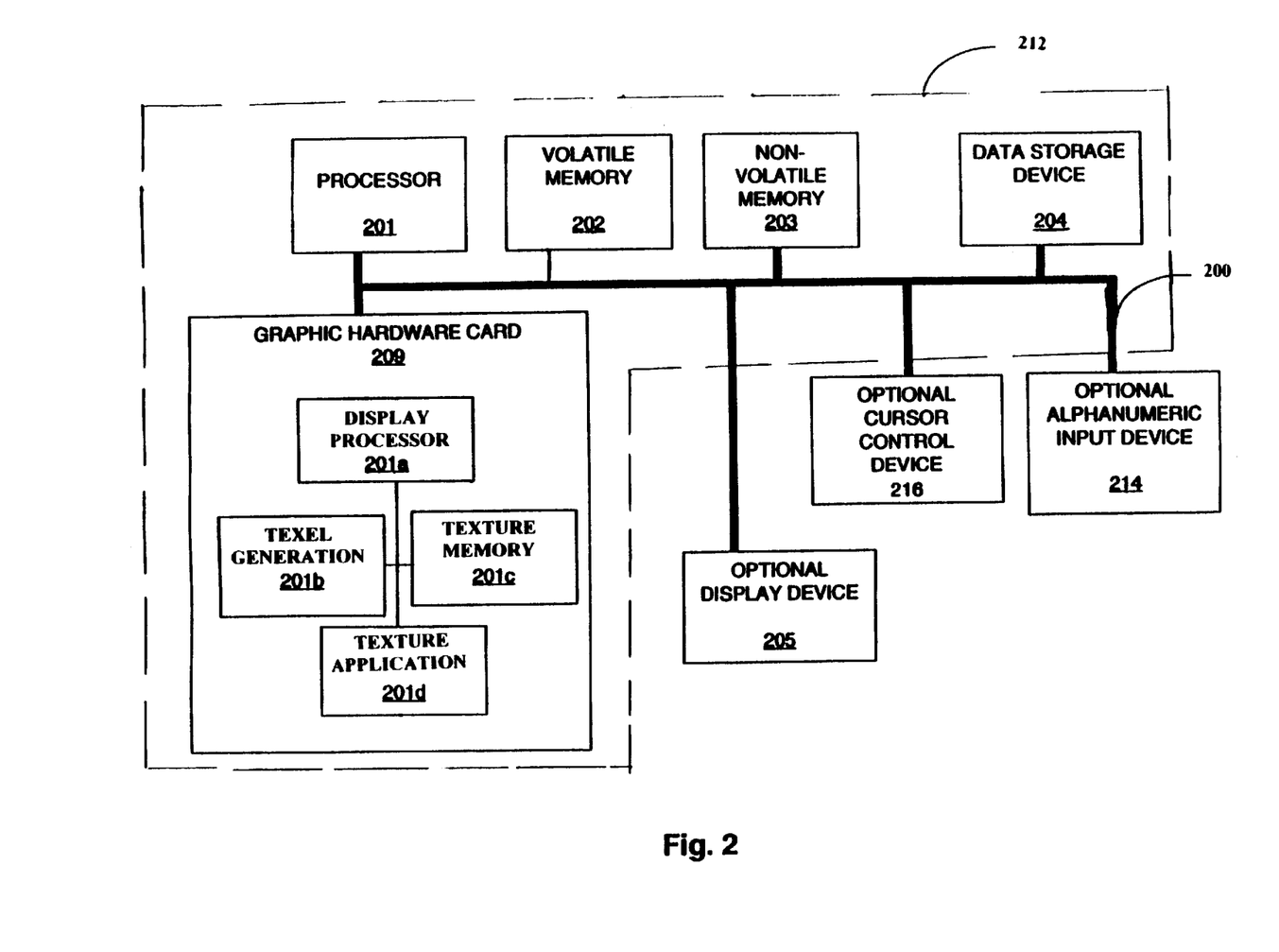
FIG. 2 is an exemplary computer controlled graphics display computer system on which the phase-angle average method may be practiced, in accordance with one embodiment of the present invention.

With reference to FIG. 2, a block diagram is shown of a computer controlled graphics display system 212 used in accordance with the present invention. In general, computer system 212 used by an embodiment of the present invention comprises an address/data bus 200 for communicating information, one or more a host processors 201 coupled with bus 200 for processing information and instructions. The computer system 212 is further comprised of a computer readable volatile memory unit 202 (e.g. random access memory unit) coupled with bus 200 for storing information and instructions (e.g., graphics data) for the host processor 201, a computer readable non-volatile memory unit 203 (e.g., read only memory unit) coupled with bus 200 for storing static information and instructions for the host processor 201, a computer readable data storage device 204 such as a magnetic or optical disk and disk drive (e.g., hard drive or floppy diskette) coupled with bus 200 for storing information and instructions. Finally, computer system 212 is comprised of a display device 205 coupled to bus 200a for displaying information (e.g., graphics primitives) to the computer user. The display device 205 utilized with the computer system 212 of the present invention can be a liquid crystal device, cathode ray tube, or other display device suitable for creating graphic images and alphanumeric characters recognizable to the user.

Optional cursor control device 216 to interface with system 212 and move cursor on the display device from location to location. Optional alphanumeric input device 214 is also used optionally to interface with system 212 and to input alphanumeric characters to system 212.

Computer system 212 also provides data and control signals via bus 200 to a graphics hardware unit ("card") 209. The graphics hardware card 209 typically contains a display processor 201a and other specialized hardware units for processing a series of display instructions found within a memory stored display list to render graphics primitives. The display processor 201a supplies data and control signals to a frame buffer (not shown) which refreshes the display device 205 via bus 200a for rendering images (including graphics images).

Volatile memory 202 and non-volatile memory 203 contain the program instructions, that when executed over processor 201, over graphics hardware card 209, and over display processor 201a, will implement a method of filtering data within a multi-dimensional graphics region. More specifically, graphics hardware card 209 utilizes a texel generation block 201b, a texture memory block 201c that stores the texture data, and a texture application block 201d that applies the texture, via a filter such as the minimum phase-angle method, to the display. The specific method and steps are described in detail hereinafter.

Phase Angle Filtering

Figure 3:
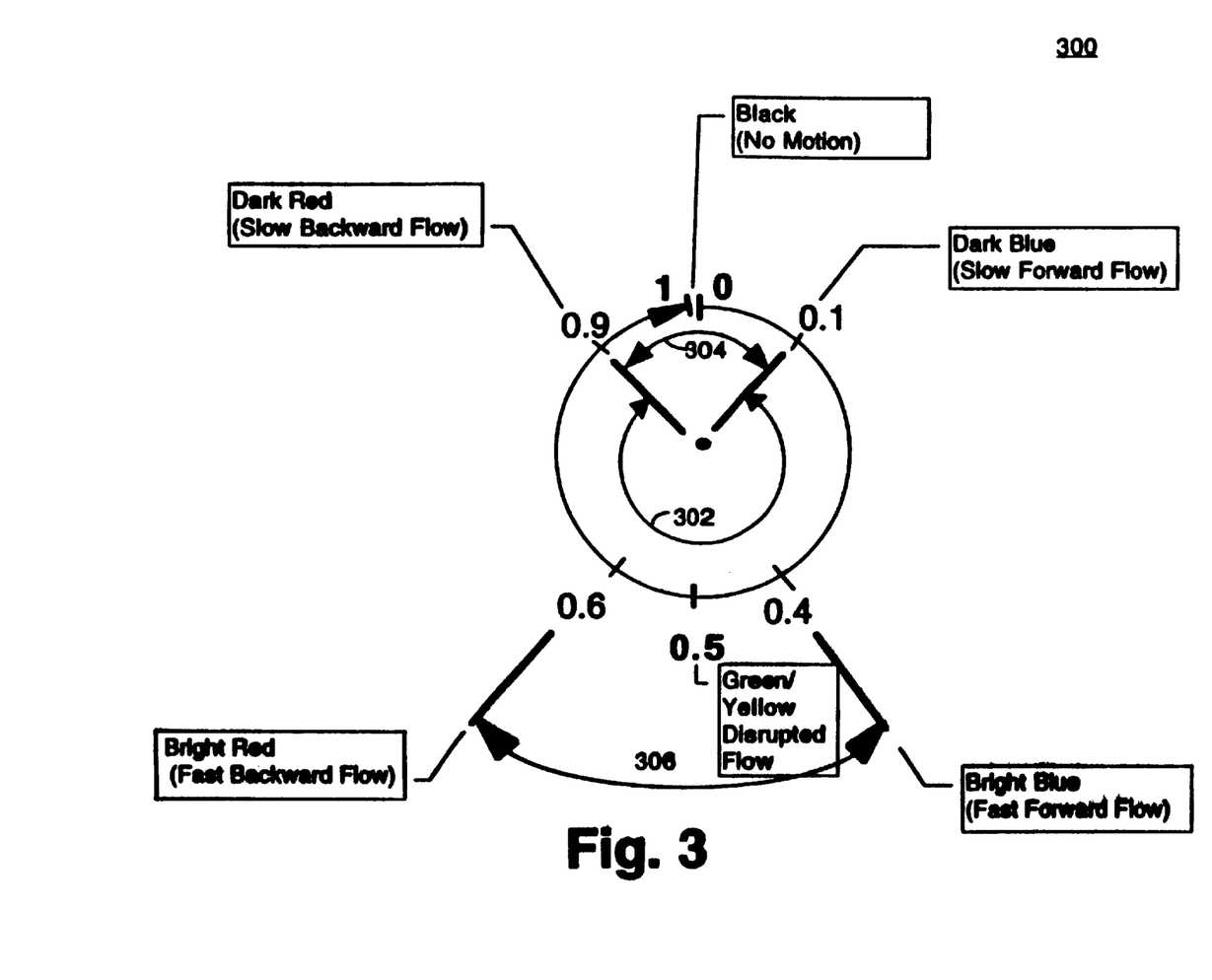
FIG. 3 is a normalized scale of attribute data presented in angular form, in accordance with one embodiment of the present invention.

Referring now to FIG. 3, a normalized scale 300 of attribute data in angular form is presented, in accordance with one embodiment of the present invention. Because the attribute data is normalized, its range is defined to be between 0 and 1. Several attribute data points exist on this scale. They will be used to illustrate the flowcharts presented hereinafter. Specifically, attribute data points at 0.1, 0.4, 0.5, 0.6, and 0.9 are listed on the normalized scale. In one embodiment, the data points on the normalized scale 300 represent the speed and direction of blood flow within a patient. as measured by Doppler-sensitive ultrasound equipment. Consequently, the lower values of the normalized scale represent a slow forward flow of blood in the patient. The middle value of the normalized scale 300 represent a higher speed of blood flow. The high values of the normalized scale 300 represent a slow backward flow of blood in a patient.

One embodiment, as described hereinafter, will utilize the minimum phase angle difference between two attribute data values. As an example, attribute data values 0.1 and 0.9 have a first phase angle difference 302 related to the difference of 0.9−0.1=0.8. Likewise, the attribute data values have a second phase angle difference 304 related to the difference of ABS[(1−0.9)+(0.1−0)]=0.2. Clearly, the second phase angle difference 304 is less than the first phase angle difference 302. This property is utilized in the methods described hereinafter. Similarly, for attribute data values 0.6 and 0.4, the phase angle difference 306 is the minimum phase angle difference.

Figure 4:
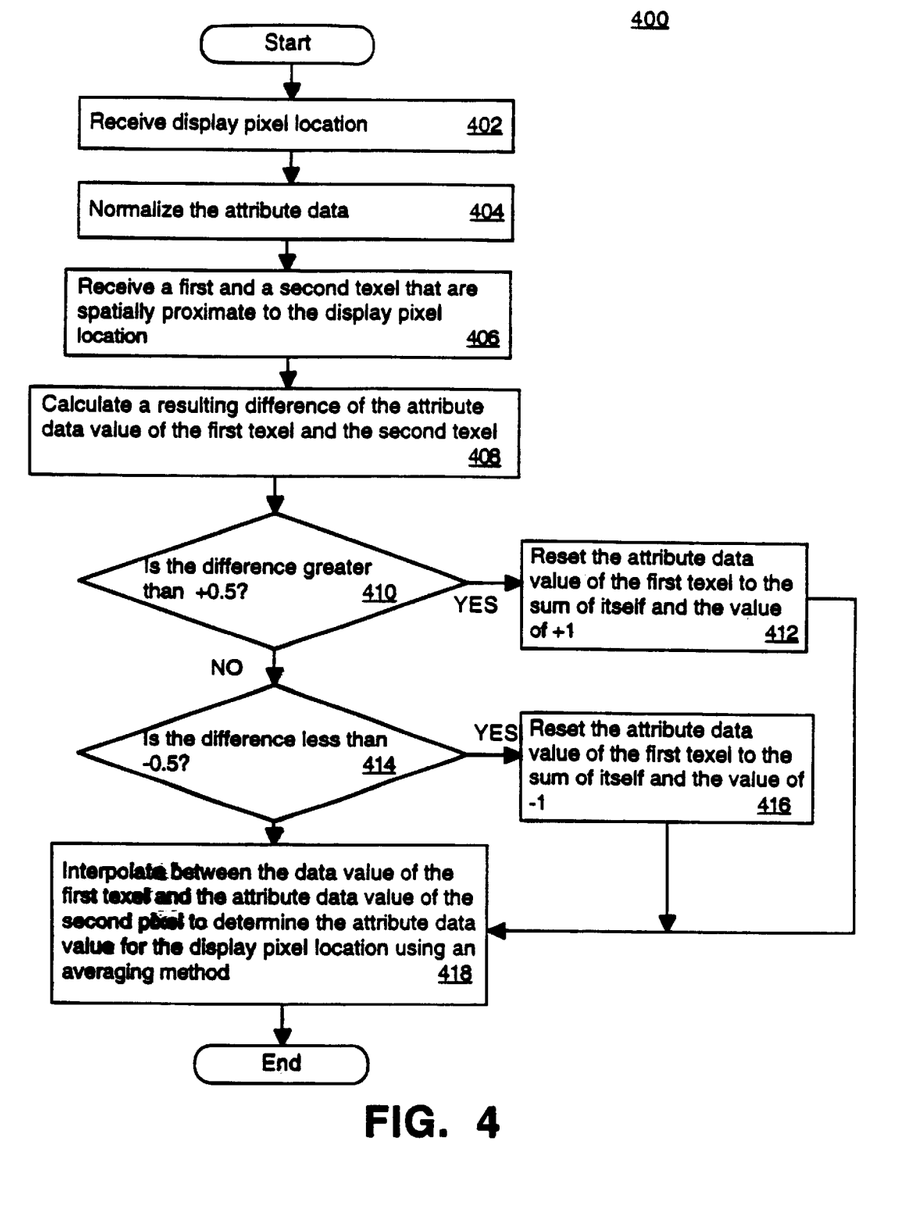
FIG. 4 is a flowchart of the steps performed to interpolate attribute data using minimum phase-angle average, in accordance with one embodiment of the present invention.

Referring now to FIG. 4, flowchart 400 of the steps performed to interpolate attribute data using minimum phase-angle average is presented, in accordance with one embodiment of the present invention. The steps provided in flowchart 400 will be illustrated using FIG. 3 in view of Prior Art FIGS. 1A and 1B.

Steps provided in flowchart 400 are implemented, in one embodiment, by the hardware illustrated in FIG. 2. Specifically, graphics hardware card 209, texel generation block 201b, texture memory block 201c, texture application block 201d, and texture filter 201e of the exemplary computer controlled graphics display computer system of FIG. 2 are used to implement the steps for filtering data according to the minimum phase-angle method. The specific method and steps are described in detail hereinafter.

At step 402, a display pixel location is received. As illustrated in Prior Art FIGS. 1B, the display pixel location could be for any pixel within the rectangular shape 112 to be mapped. The location of the pixel is considered, as is well-known in the art, with respect to the size of the texture map to be projected onto it.

At step 404, the attribute data is normalized. This step is represented in FIG. 3 where the scale for the attribute data goes from 0 to 1.0. The maximum value should always be 1 in a normalized system. If an attribute data happens to be greater than 1 in subsequent steps following normalization, then only the fractional part, e.g. less than 1, is considered. While the present embodiment utilizes normalization to simply the hardware complexity, the present invention does not absolutely require this step.

At step 406, the first and second texel that is spatially proximate to the display pixel location is received. In one embodiment, the first and second texels are those closest to the display pixel to be mapped in step 402. However, the texels can be chosen based on criteria different than spatial proximity. In one embodiment, the texture map is only in a single dimension, e.g. in the X-direction. However, attribute data pixels in the Y-dimension and the Z-dimension are equally applicable. If the X-direction were chosen, and if the two closest texels from texture map 102 a were $t_{0,0}$ and $t_{0,1}$ as shown in Prior Art FIG. 1A, then these two texels would be the texel values used in the subsequent steps. The attribute data values belonging to $t_{0,0}$ e.g. the first texel attribute data value, and to,. e.g. the second texel attribute data value, are determined by either the user or by a process/event measured. For example, the user could choose a brick pattern texture from a library of textures or the user could use blood flow data measured from a Doppler-sensitive ultrasound diagnostic procedure on a patient. In the latter example, the texel map might have a value of 0.9 for texel $t_{0,0}$ and a value of 0.1 for texel $t_{0,1}$ as dictated by the results of the ultrasound procedure.

The following steps perform the filtering function on anttribute data value of a texel. While the present embodiment filters the attribute data value of the first texel and not the second texel, the present invention could be used to filter either one of the texels.

At step 408, the difference of the attribute data values of the first texel and the second texel are determined. In one embodiment, the following formula is used to calculate the difference:

$$\text{Delta} = (t_{0,0} - t_{0,1})$$

In step 410, it is determined whether the difference calculated in step 408 is greater than approximately 0.5. The value of 0.5 is chosen to represent approximately half of the magnitude of the normalized scale for attribute data. Thus, if a scale greater than 1 is chosen for normalization, the threshold value will change from 0.5 to a value approximately equivalent to half the magnitude of the maximum attribute data value. Returning to step 410, if the difference is greater than approximately 0.5, flowchart 400 proceeds to step 412. If the difference is not greater than approximately 0.5, then flowchart 400 proceeds to step 414.

In step 412, the attribute data value of the first texel is reset to the sum of itself and the value of +1.0. In this manner, the attribute data is essentially filtered with reference to the normalized attribute data scale. Following step 412, flowchart 400 proceeds to step 418. The resultant value is the filtered first texel attribute data value. Regardless of whether the first texel attribute data value changes or not, it has still been filtered because it has undergone filtering steps that check its attribute data value. Hence, regardless of whether the first texel attribute data value changes or not, it is afterward referred to as the filtered first texel attribute data value. While the present embodiment filters the first texel attribute data value, the second texel attribute data value could have been filtered instead.

Steps 414 and 416 are essentially similar, albeit reverse polarity, to steps 410 and 412. In step 414, it is determined whether the difference calculated in step 408 is less than approximately −0.5. The value of −0.5 is chosen to represent approximately half the magnitude of the normalized scale of the attribute data. Thus, if a scale greater than 1 is chosen for normalization, the threshold value will change from −0.5 to a value approximately equivalent to half the magnitude of the maximum attribute data value. Returning to step 414, if the difference is less than approximately −0.5, flowchart 400 proceeds to step 416. If the difference is not less than approximately 0.5, then flowchart 400 proceeds to step 418.

In step 416, the attribute data value of the first texel is reset to the sum of itself and the value of +1.0. In this manner, the attribute data is essentially filtered with reference to the normalized attribute data scale. Following step 416, flowchart 400 proceeds to step 418.

As a brief example of the previous steps, if the value of Delta 1 is less than −0.5, then the second attribute data texel, in this case $t_{0,1}$, is filtered by adding a −1.0 to it. Similarly, if the value of Delta 1 is greater than +0.5, then the second attribute data texel, in this case $t_{0,1}$, is filtered by adding a +1.0 to it. Thus, in the current example, $t_{0,0} - t_{0,1}$ equates to 0.1−0.9=−0.8. Because this sum is less than −0.5, the value of −1.0 is added to $t_{0,1}$, yielding −1.0 +0.9=−0.1. Hence, the present invention provides an alternative to the convention method of simply using only the unmodified attribute data values.

With the present invention, the interpolation or average of attribute data corresponding to the minimum phase angle between two attribute data points is used. This method is used for several reasons. First it provides an alternative method of interpreting texel data. The users of texel data may simply find interpolation by minimum phase angle to provide a more meaningful interpretation of their data. And secondly, the minimum phase angle may reduce the error in interpolating the texture map. For example, if the values of 0.9 and 0.1 were used, the conventional interpolation, or averaging, operation would yield a result that is drastically different than the two nearest values. For example, an averaged value of 0.5 is very distant from either attribute values of 0.1 and 0.9. That is, the average of 0.5 is located 0.4 units away from 0.1 and from 0.9 However, with the present embodiment, the linear phase-angle interpolation yields a result of 0 for attribute data points 0.1 and 0.9. This corresponds to an error, or difference, between the interpolated value and the attribute data points of: ABS[(0.9–0.0)+ (0.1–0.0)]=0.2. Clearly, the difference of 0.2 using the present embodiment is better than the difference of 0.8 using the conventional method. Hence, the present invention provides an alternative method for viewing attribute data and it provides an improved method for interpolating normalized data.

Finally, at step 418, an interpolation result is calculated using the data value of the first and second texels, as appropriate for the display pixel location. Importantly, the filtered attribute value of the first texel should be used if it had to be calculated in steps 412 or 416. While the present embodiment modifies the first texel in these steps, the present invention is well-suited to modifying the second texel with a value that yields a similar result. In one embodiment, the interpolation can use a simple average where the two attribute data points are added together, then divided by 2. In this embodiment, the formula would be:

$$\text{Interpolation-Simple} = (\text{SUM}_0{}^m(\text{attribute value}(m))/m))$$

In the two dimensional case, the simple interpolation would yield:

$$\text{Interpolation-Simple} = [(t_{0,0} - t_{0,1})/2]$$

Using the previous example, the Interpolation using a simple average would yield: Interpolation=((0.1)+(−0.1))/2=0. This sum would result regardless of how close the display pixel was to either of the two attribute data values.

Alternatively, another embodiment could use a weighted interpolation. In that embodiment, the value of the attribute data values would be weighted using weighting factors whose sum would be equal to one so as not to distort the normalization of the attribute data. The formula for this embodiment would read:

$$\text{Interpolation-Weighted} = [1\alpha)t_{0,0}(\alpha)t_{0,1}]$$

where is the distance from t 0,1 pixel. The resultant interpolation value is the attribute -data value assigned to the display pixel.

In the present example, if the two attribute data values were a unit value apart from each other, and the display pixel was located 80% of the unit value from the second attribute data pixel, then the weighted-Interpolated value would be:

$$\text{Interpolated-Weighted} = [(1-0.8)t_{0,0} - (0.8)t_{0,1}] = [(0.2)(0.1) - (0.8)(-0.1)] = +0.1$$

Only the fractional value of any method of interpolation is used because the attribute data scale only ranges from 0 to 1. In this method, the present embodiment of the invention utilizes a meaningful way of interpreting the phase angle of the data and not just the scalar value. This provides a new and useful technique with which to interpret attribute data in a texture mapping application.

Figure 5:
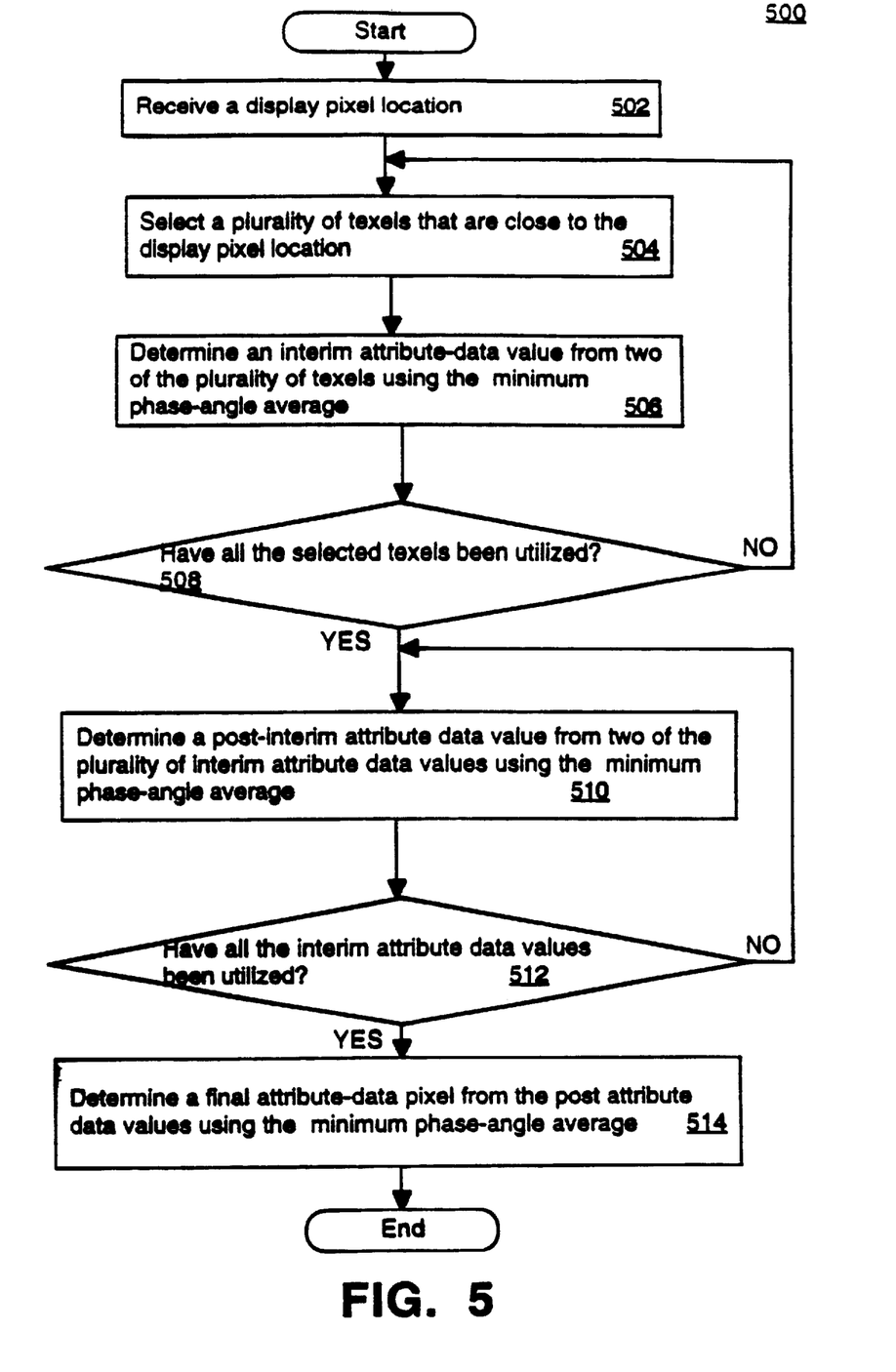
FIG. 5 is a flowchart of the steps performed to filter attribute data with multi-dimensional properties, in accordance with one embodiment of the present invention.

Referring now to FIG. 5, a flowchart 500 of the steps performed to filter attribute data within a graphics region using a computer controlled graphics display system 200 is presented, in accordance with one embodiment of the present invention. The steps provided in FIG. 5 are similar to those presented in FIG. 4, but include the capability of multiple dimensions of attribute data.

In step 502, a display pixel location is received. In one embodiment, the pixel can have only a single degree of freedom, e.g. a one-dimensional variable such as the spatial direction 'X.' In another embodiment, the display pixel can have two, three, or more degrees of freedom. In this fashion, the complexity of the display pixel can include three-dimensional space plus additional dimensions such as time, etc.

In step 504, a plurality of texels that are close to the display pixel location are selected. In one embodiment, the plurality is a quantity equal to two for a single dimension degree of freedom. In another embodiment, the plurality is a quantity equal to four for a two-dimensional degree of freedom. In another embodiment, the plurality is a quantity equal to eight for a three-dimensional degree of freedom. Similarly, other embodiments can encompass any quantity of dimensions. Another embodiment is the relationship between the display pixel and the texels which can be close proximate location or other relationships.

In step 506, an interim attribute-data value is determined from two of the plurality of texels using the minimum phase-angle average. The minimum phase-angle average, or interpolation, is described hereinabove for FIG. 4. Any two of the plurality of texels can be averaged. In one embodiment, two texels in the X-direction can be averaged first. In another embodiment, two texels in the Y-direction can be averaged first. As long as the procedure is used consistently, the sequence of order is not important. The results should be the same regardless of sequence because the process uses linear calculations. Typically, if the attribute data value is in the X- and Y-direction, then the texels in the X-direction can be reduced to an interim attribute data values that have a different Y-location. These interim attribute data values will be addressed in step 510.

Figure 3A:
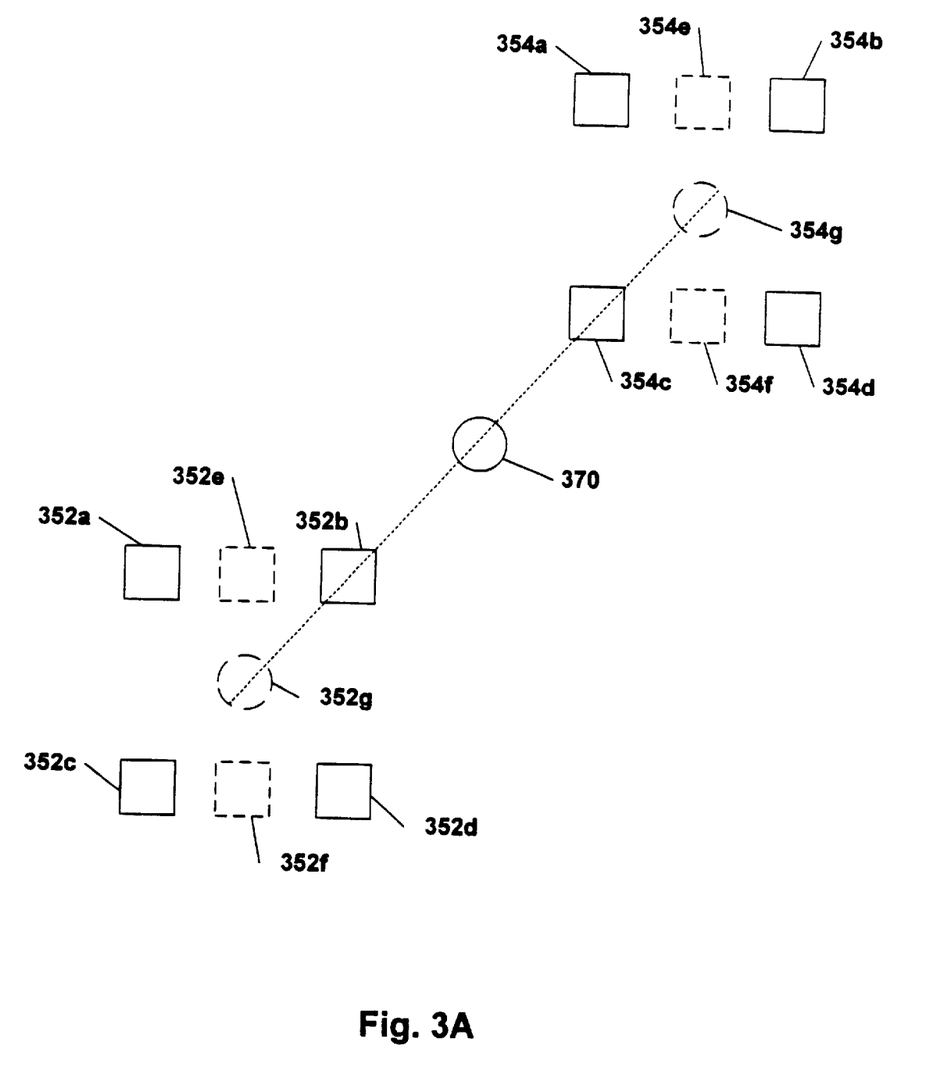
FIG. 3A is an illustration of selecting a plurality of texels forming group I texels (e.g. 352a, 352b. 352c, 352d) and a plurality of texels forming group II texels (e., 354a, 354b, 354c, 354d). Group I texels and group II texels will be utilized to find interim attribute-data values. Intert data values 352e, 353f, and 354e and 354f are used to interpolate post-interim value 352g and 354g respectively.

Step 508 determines whether all selected texels 352a, 352b, 352c, 35d, 354a, 354b, 354c, and 354d have been disregarded. If all the selected texels have been utilized to determine interim attribute-data values, then flowchart 500 proceeds to step 512. If all the texels have not been utilized to determine an interim attribute data value, then flowchart 500 proceeds to step 504.

In step 510, a post-interim attribute-data value from any two of the plurality of post-attribute-data values is determined using the minimum phase-angle average. Using the previous three-dimensional embodiment, the interim attribute-data values 352e and 352f, and 354e and 354f would now be interpolated using the minimum phase-angle average to obtain post-interim data value 352g and 354g, respectively.

In step 512 if all the interim attribute data values have been utilized to determine post-interim attribute data values, then flowchart 500 continues to step 518. If however, all the interim pixels have not been utilized to determine post-interim attribute-data values, then flowchart 500 returns to step 512, where the steps are repeated.

In step 514, a final attribute-data value is determined from the final two of the plurality of post attribute-data values using the minimum phase-angle average as described hereinabove. In a three-dimensional attribute data value embodiment, a final data value for display pixel 370 is determined by the minimum phase-angle averaging of post-interim attribute data values 352g and 354g. While the present embodiment describes a three-dimensional attribute data scenario, either fewer or more dimensions can be accommodated by using the same principles illustrated herein. With more or less dimensions, either more or less steps will be required to determine interim values.

Furthermore, the averaging, or interpolating can be a simple average or a weighted average using the relative location of the display pixel to the location of the texels.

Figure 6:
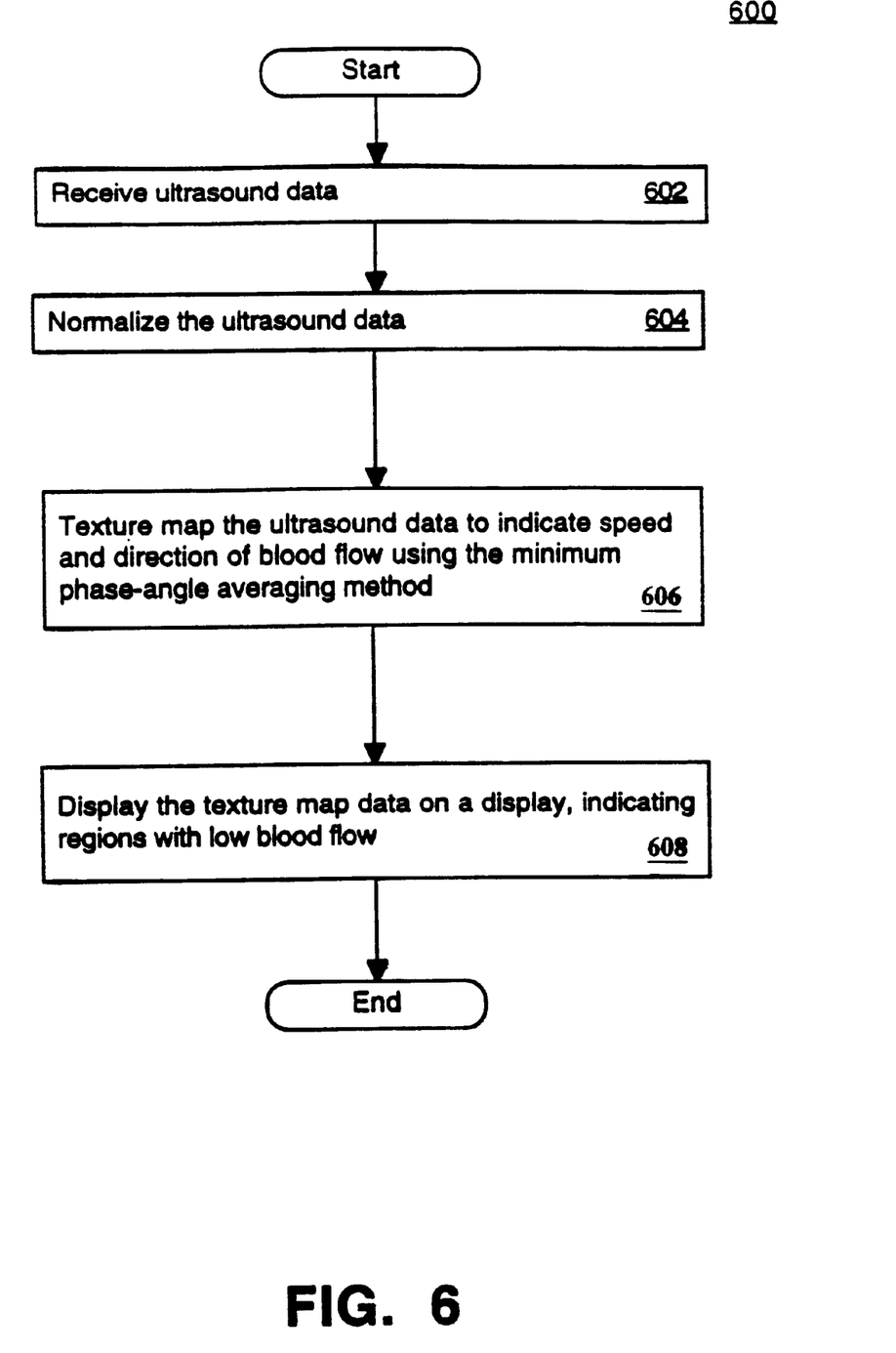
FIG. 6 is a flowchart of the steps performed to texture map ultrasound data using the minimum phase-angle averaging method, in accordance with one embodiment of the present invention.

Referring now to FIG. 6, a flowchart 600 of the steps performed to texture map ultrasound data using the minimum phase-angle averaging method is presented, in accordance with one embodiment of the present invention.

In step 602, the ultrasound data is received. The method and equipment used to obtain this data is not important. The subsequent processing of the data is the focus of this flowchart. The ultrasound data does provide data indicating direction and flow rate of the blood flow.

In step 604, the ultrasound data is normalized. By normalizing the data, the maximum value is automatically set to 1 by dividing all data points by the maximum ultrasound data value. The result will be an attribute data scale similar to that presented in FIG. 3.

In step 606 ultra sound data received in step 602 is textured to indicate speed and direction of blood flow using the minimum phase-angle averaging method.

In step 608, the texture map from step 606 is projected onto a display device 205 in a computer system 212. In this manner, an end user may visually observe the ultrasound data and perform judgments and prognosis based on the information presented.

Thus, the present invention provides a method for finding an average, or interpolated, value that accounts for the digitized attribute data. Furthermore, a need arises for a method of interpolating the texture mapping operation to account for the digitized attribute data and phase. If these needs are met, then more accurate images may be obtained, more accurate diagnoses may follow using faster and less-expensive computer processing hardware and software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a computer system, a method for structuring texel data as phase angle inputs to a texture filter, comprising the steps of:
    a) receiving a display pixel location;
    b) receiving a first texel attribute data value and a second texel attribute data value;
    c) filtering said first texel attribute data value to create a filtered first texel attribute data value such that a resulting difference between said filtered first texel attribute data value and said second texel attribute data value is not greater than approximately half of a magnitude of a maximum attribute data value; and
    d) interpolating between said filtered first texel attribute data value and said second texel attribute data value, to generate an attribute data value for said display pixel location.

2. The method as recited in claim 1 further comprising the step of:
    e) normalizing said first texel attribute data value and said second texel attribute data value to a maximum value of approximately 1.

3. The method as recited in claim 1 wherein said step c) comprises the steps of:
    c1) subtracting said first texel attribute data value from said second texel attribute data value to obtain said resulting difference;
    c2) resetting said first texel attribute data value to a first sum of itself and of a value +1, if said resulting difference is greater than approximately 0.5; and
    c3) resetting said first texel attribute data value to a second sum of itself and of a value −1, if said resulting difference is less than approximately −0.5.

4. The method as recited in claim 1 wherein said first and said second texel attribute data value are those texels that are spatially closest to said display pixel location.

5. The method as recited in claim 1 wherein said interpolation uses a simple average.

6. The method as recited in claim 1 wherein said interpolation is a weighted average based on a relative spatial location of said display pixel location to said first and said second texel location.

7. In a computer controlled graphics display system having a processor coupled to a bus, a display device coupled to said bus and a computer readable memory unit coupled to said bus, a method for filtering attribute data within a graphics region, said method comprising the steps of:
    a) receiving a display pixel location;
    b) selecting a plurality of texels that are spatially proximate to said display pixel location, each of said plurality of texels having an attribute data value;
    c) determining a respective interim attribute data value of said attribute data value of two of said plurality of texels using a minimum phase-angle average;
    d) repeating step c) until all of said plurality of texels have been utilized once for determining said respective interim attribute data value;
    e) determining a respective post-interim attribute data value of two of said interim attribute data values using said minimum phase-angle average;
    f) repeating step e) until all of said interim attribute-data values have been utilized once for determining said respective post-interim attribute data value; and
    g) determining a final attribute data value for said display pixel location using said minimum phase-angle average of a final two post-interim attribute data values, if available.

8. The method as recited in claim 7 wherein said minimum phase-angle average is a simple average.

9. The method as recited in claim 7 wherein said minimum phase-angle average is a weighted average.

10. The method as recited in claim 7 wherein said attribute data is a texture map and said attribute-data pixels are texels.

11. A computer controlled graphics display system comprising:
    a processor coupled to a bus;
    a display device coupled to said bus;
    a computer readable memory unit coupled to said bus and containing program instructions stored therein that when executed over said processor implement a method for filtering data within a three-dimensional graphics region, said method comprising the steps of:
    a) receiving a display pixel location;
    b) receiving a first and a second texel that are spatially proximate to said display pixel location, said first texel having an attribute data value and said second texel having an attribute data value;

c) filtering said attribute-data value of said first texel to create a filtered first texel attribute data value such that a resulting difference between said filtered first attribute-data value and said attribute-data value of said second texel is not greater than approximately half of a magnitude of a maximum attribute data value; and d) obtaining an average of said filtered first texel attribute data value and said second attribute data value, said average being an attribute data value assigned to said display pixel.

12. The system as recited in claim 11 further comprising the step of:

e) normalizing said attribute data value for said first texel and said second texel to a maximum value of approximately 1.

13. The system recited in claim 11 wherein said step c) of said method comprises the steps of:

c1) subtracting the value of said first attribute-data pixel from the value of said second attribute-data pixel to obtain said resulting difference;

c2) resetting the first texel attribute data value to the sum of itself and the value +1 if said difference is greater than approximately 0.5; and c3) resetting the first texel attribute data value to the sum of itself and the value −1 if said difference is less than approximately −0.5.

14. The system recited in claim 11 wherein said first and said second texel attribute data value in said method are those texels that are spatially closest to said display pixel location.

15. The system recited in claim 11 wherein said interpolation in said method uses a simple average.

16. The system recited in claim 11 wherein said interpolation in said method is a weighted average based on a relative spatial distance from said display pixel location to a location of said first texel and from said display pixel location to a location of said second texel.

* * * * *